Dec. 9, 1952 — G. EATON — 2,620,873
FLASH CUTTER FOR RUBBER HEELS
Filed May 27, 1948 — 3 Sheets-Sheet 1

Inventor
GERALD EATON
By Lindsey, Prutzman + Just
Attorneys

Dec. 9, 1952    G. EATON    2,620,873
FLASH CUTTER FOR RUBBER HEELS
Filed May 27, 1948    3 Sheets-Sheet 2
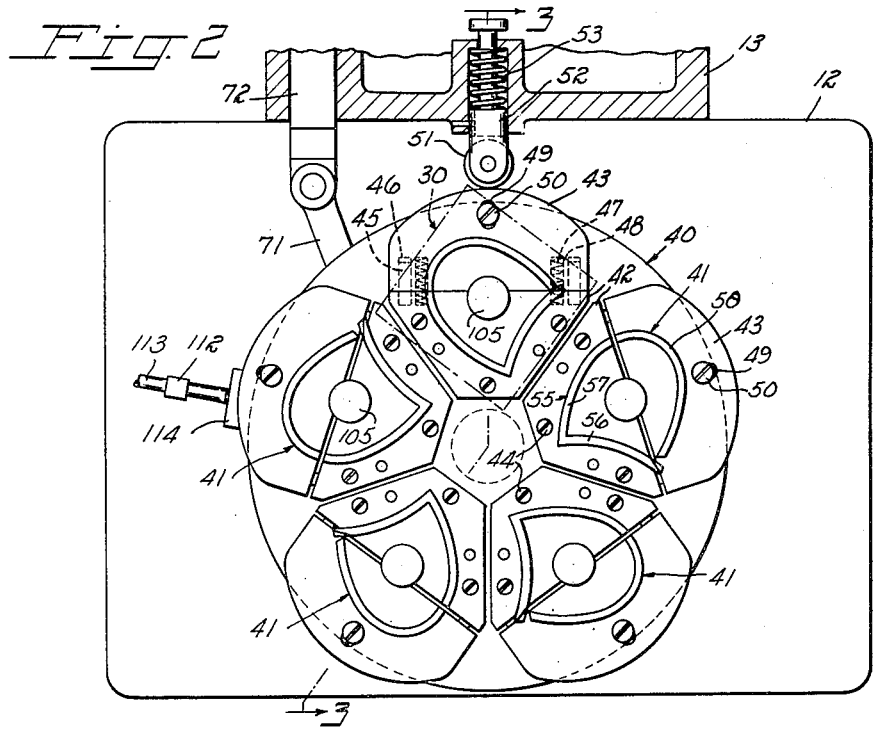
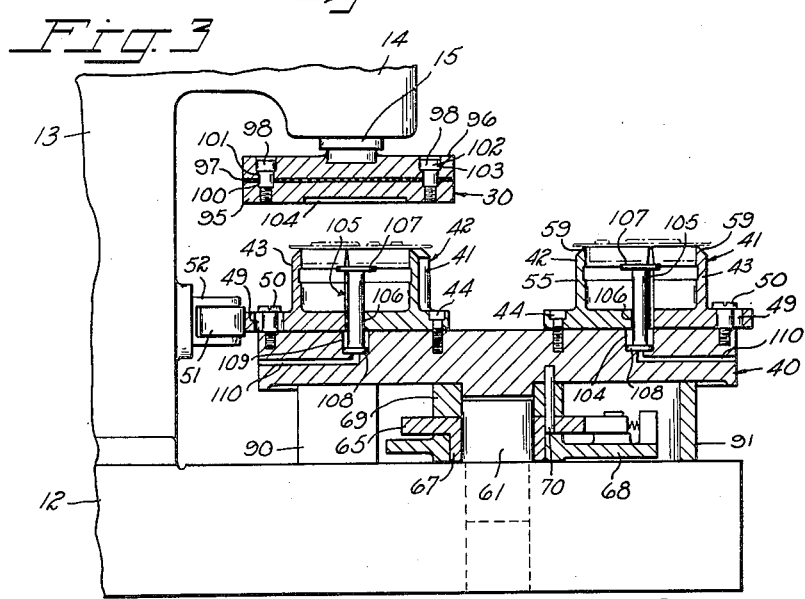
Inventor
GERALD EATON
By
Attorneys Dec. 9, 1952   G. EATON   2,620,873
FLASH CUTTER FOR RUBBER HEELS
Filed May 27, 1948   3 Sheets-Sheet 3

Inventor
GERALD EATON

By
Lindsey, Prutzman & Just
Attorneys

Patented Dec. 9, 1952

2,620,873

UNITED STATES PATENT OFFICE 2,620,873

FLASH CUTTER FOR RUBBER HEELS

Gerald Eaton, Manchester, Conn., assignor, by mesne assignments, to The H. P. Townsend Manufacturing Company, Elmwood, Conn., a corporation of Connecticut Application May 27, 1948, Serial No. 29,611

5 Claims. (Cl. 164—20)

The present invention relates generally to cutting apparatus and more particularly to a machine including a power press for quickly and efficiently removing the flash from molded rubber heels.

In the fabrication of rubber heels in the usual manner by molding processes, a ribbon of rubber commonly referred to as the "flash" or "rind" remains affixed to the heel about its periphery adjacent either the face or back of the heel. Before the heel is ready for use this flash has to be removed in some way such as by running a cutting instrument about the periphery of the heel to sever the flash and thereby complete the formation of the side wall of the heel.

It is an object of the invention to provide a machine for removing the flash from rubber heels which operates on a different principle from that heretofore commonly utilized in this operation in that the machine embodies a modification of a power press including a novel die and striker plate constructed in accordance with the invention for severing the flash from the heel.

Included in the above object is the aim of providing a machine which will operate to cut the flash from the heel in a clean and neat manner such that the previous presence of the flash will in no way mar the appearance of the heel or present any visible markings in the heel and so that the heel will be finished with a desired smooth peripheral wall.

The principal object of the invention is to provide such a machine which will operate at a high speed such that the flash may be removed from heels in a rapid fashion with the result that the unit cost of this operation is reduced to a minimum.

Another object is to provide a machine of this character which will be consistent and uniform in operation and performance despite variation in the molded heel and with rejects maintained at a small number.

Another object of the invention is to provide a machine of this type which is substantially automatic in operation so that it is necessary for the operator merely to load the machine and initiate its operation. If desired, these latest functions may also be carried out automatically.

A further object of the invention is to provide a machine having the advantages enumerated above which at the same time is of simple design embodying a minimum of parts so that the same is easy and inexpensive to manufacture and yet which is of a rugged construction so that it will not readily get out of order and will provide satisfactory service over long periods of time without the necessity of frequent replacements or repairs.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings,

Fig. 2 is a fragmentary plan view partially in cross section showing the construction of the dies and turret.

Fig. 3 is a fragmentary side view of the apparatus with a portion thereof in cross section along the line 3—3 of Fig. 2.

Figure 1:
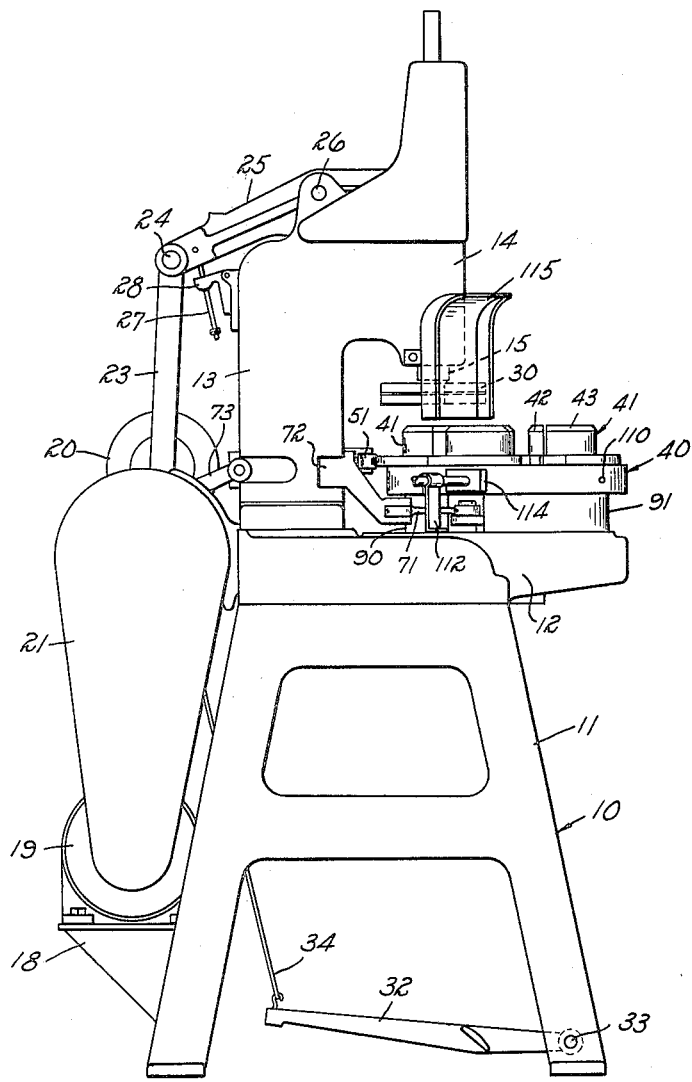
Fig. 1 is a side view of a completed machine embodying the present invention.

Referring to the drawing and particularly to Fig. 1 thereof, the apparatus is shown as comprising a base 10 formed of a plurality of A-frame members 11 on which is supported a conventional bed 12. Mounted on the rear of the bed 12 is a head 13 having an overhanging portion 14 in which is mounted a conventional ram 15, the ram being slidable longitudinally toward and away from the bed 12.

Supported on the base 10 by means of brackets 18 is a motor 19 operatively connected to drive a crank 20, as for example, through a belt and a plurality of pulleys (not shown) which are concealed behind the guard 21.

The crank 20 has secured thereto a connecting rod 23 which is pivotally connected at 24 to a hold-down lever 25 which in turn is pivoted at 26 on the head 13. As will be apparent, when the crank 20 is rotated by the motor 19, the hold-down lever 25 is reciprocated about the pivot 26.

When the hold-down lever 25 is pivoted in a clockwise direction, as viewed from Fig. 1, it acts to extend a spring (not shown) which spring loads the ram 15, this ram 15 being retained in its upright position by a conventional holding bolt (not shown). When the hold-down lever 25 reaches the end of its clockwise movement such that the spring is compressed, a latch bolt trip rod 27 secured to the lever 25 engages the latch bolt link 28 which in turn withdraws the bolt holding the ram 15, thereby releasing the ram so that it may operate the striker 30 affixed thereto. On the return movement of the hold-down lever 25, the ram 15 is raised in the usual manner.

To provide for discontinuous movement of the crank 20 there may be provided a footpedal 32 pivotally supported at 33 on the base 10 and having at its other end a link 34 connected to a clutch mechanism (not shown) for connecting the motor drive to the crank 20, the clutch mechanism being automatically disengaged following a single revolution of the crank 20.

The apparatus so far as above described is a conventional power press which construction of itself does not constitute any part of the present invention. Inasmuch as apparatus of this type is well known in the art, further description is deemed to be unnecessary, and reference may be had to the patented art for such constructions or modifications as may be desired.

In accordance with the invention, the power press is modified to permit the same to be used for the automatic and rapid removal of the flash from rubber heels. To this end there is rotatably mounted on the bed 12 for indexing in a horizontal plane a circular turret 40 having thereon a plurality of dies 41 (shown five) constructed and arranged in accordance with the invention for cooperation with the novel striker 30 operated by the ram 15. The dies 41 are constructed in accordance with the invention so that when a heel is placed therein the flash extends across the top of the die and will be removed when the top of the die is struck by the striker 30.

A particular unexpected advantage of the dies 41, constructed in accordance with the invention, is the ability of the die to freely receive a rubber heel during a loading operation when the heel is approximately centered therein and without the need for any special manipulation by the operator. As will be realized, the speed of operation of a machine of this character can be no greater than the rate at which the operator can place the heels accurately in the dies. It has been discovered that by making the die 41 in two parts comprising a fixed section 42 and a sliding section 43, these sections being so arranged that their intersection extends diagonally across the heel, the die can be opened to provide a clearance between the heel and the die all about the periphery thereof. Even though the separation is limited so as not to clear the flash, the heels to be trimmed can be easily dropped into the die without delay. It will be observed, in accordance with the invention, that a conventional rubber heel has a point of greatest width midway between the front and back of the heel. No other way of separating the die such as laterally or horizontally of the heel has been found to be effective because there always remains a close fit in at least one dimension of the heel. It is an unexpected discovery of the present invention that the diagonal separation of the die 41 completely eliminates any close fits between the heel and the die in any dimension so that the heels may be correctly inserted therein at a maximum speed.

In order to provide for the separation and closing of the die 41, the die is placed on the turret so that the diagonal separation thereof lies parallel to a tangent to the turret, the result being that the die 41 may be opened and closed by movement of the sliding section 43 radially of the turret.

The fixed sections 42 are fixed to the turret 40 in spaced relationship by any suitable fastening means such as the screws 44. The sliding sections 43 are aligned with the fixed sections 42 by means of sliding dowels 45 received in aligned openings 46 in the abutting edges of the fixed and sliding sections 42 and 43. The sliding section 43 is urged outwardly away from the fixed section 42 by means of springs 47 received in openings 48 in the abutting ends of the die sections. Alignment of the sliding sections 43 is further assured by reason of the slots 49 therein through which are received screws 50 extending into the turret 40.

The fixed section 42 includes an upright wall 55 which extends in a curved manner at 56 along the front of the heel and a second curved portion 57 which extends in a curved manner along the adjacent side of the heel. The sliding section 43 includes an upright wall 58 which is a continuous curved section continuing around the remainder of the heel. The tops of the walls 55 and 58 are beveled at 59 as best shown in Fig. 3 so as to provide a cutting edge lying closely around the periphery of the heel when the die is closed and such that when the heel is struck with a striker the flash will be cleanly and efficiently separated therefrom. The separation of the dies 41 is sufficient to facilitate the insertion of the rubber heels therein, as previously described, but at the same time is sufficiently limited that the flash will be supported on the beveled edge 59. The position of the heel having a flash, when inserted in the open die, is best shown at the righthand portion of Fig. 3. The closed position of the die is best shown at the lefthand portion of Fig. 3.

In view of the separation of the die 41, it will be appreciated that difficulty may be experienced in obtaining a clean cut at the separation line of the die. This difficulty has been completely obviated in accordance with the present invention by undercutting the meeting edges of the wall 58, as best shown in Fig. 3. This ensures a point contact in the cutting edge without any possibility of a separating space which would interfere with the cutting of the flash. Also in accordance with the invention, the front portion 56 of the wall 55 is extended beyond the edge of the fixed section 42 so that the end of the wall 58 will abut against a continuous surface of the wall 56 rather than a corner thereof.

The indexing of the turret 40 is adapted to bring the dies 41 in sequence to a position beneath the ram 15 so that a rubber heel inserted into the die 41 will be struck by the striker 30 to sever the flash therefrom. The closing of the die 41 at this point is accomplished by camming means comprising a roller 51 mounted on a plunger 52 which is slidably received in the head 13 and urged outwardly by the spring. The spring 53 is sufficiently strong to completely close the die, the die being designed when closed to fit snugly around the periphery of the heel to ensure a clean severance of the flash.

The indexing of the turret 40 is conveniently carried out in accordance with the invention by the following indexing arrangement operated by the crank 20 in timed relationship with the operation of the ram 15.

Rotatably mounted on a post 61 set into the bed 12 is an indexing plate 65 having a hub 67 the end of which rests on the bed 12. Rotatably mounted on the hub 67 and extending underneath the indexing plate 65 is a ratchet plate 63. The turret 40 is supported on the indexing plate 65 through an intermediate collar 69, and the turret 40, collar 69 and indexing plate 65 are arranged to rotate as a unit through suitable interconnecting means such as the pin 70.

The ratchet plate 68 is adapted to be reciprocated by means of a connecting rod 71 secured at one end to a slide 72 which, in turn, is connected by the connecting rod 73 to the crank 20. By reason of these actuating members, the ratchet plate 68 is reciprocated first in a clockwise direction and then in a counter-clockwise direction during each revolution of the crank 20, i. e., each time that the footpedal 32 is actuated.

The ratchet plate 68 has mounted thereon a ratchet pawl 75 which is urged inwardly by the spring 76 to engage in sequence the notches 77 in the indexing plate 65. During counter-clockwise movement of the ratchet plate 68, the pawl 75 carries the indexing plate 65 along with the ratchet plate and during clockwise movement of the ratchet plate 68, the pawl 75 is cammed outwardly by the periphery of the indexing plate 65 until it engages in the next notch 77.

In order to ensure accurate indexing of the turret 40, the indexing plate 65 is provided with a series of spaced tapering notches 78 adapted to receive the nose of an indexing pawl 79. The indexing pawl 79 is urged into engagement with the indexing plate 65 by means of a plunger 80 slidably mounted in a housing 81 secured to the bed 12. The plunger 80 is provided with an axial bore 82 in which is received a spring 83 retained in place by the screw plug 84.

Figure 4:
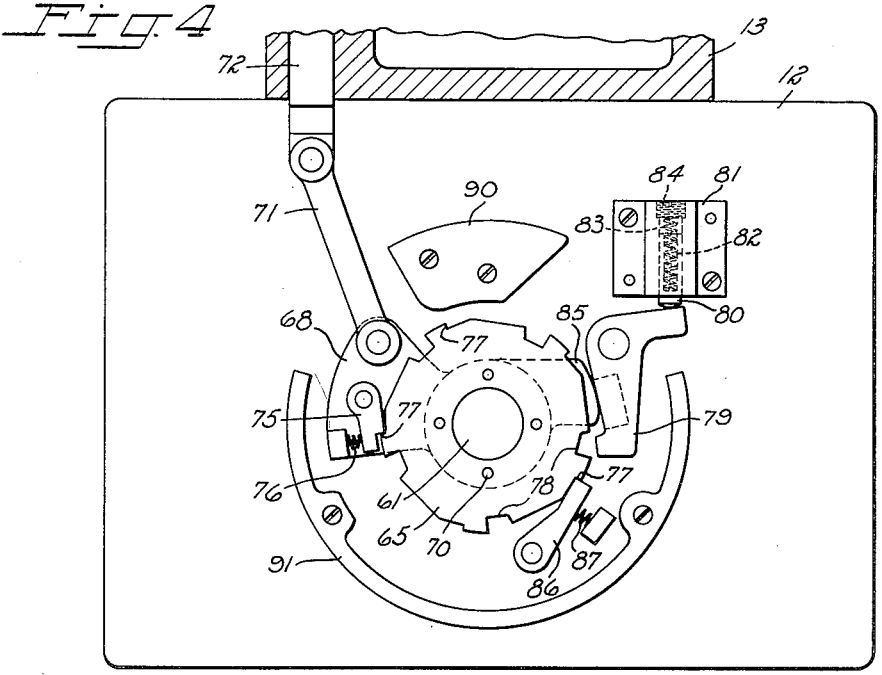
Fig. 4 is a view similar to Fig. 2 with the turret removed.

During an indexing operation, when the ratchet plate 68 is moved clockwise to permit the pawl 75 to engage the next notch 77, a projection 85 on the ratchet plate 68 engages the indexing pawl 79 and cams it outwardly, as shown in Fig. 4, so as to free the nose thereof from the notch 78 with which it was previously engaged. The indexing plate 65 is now free to be rotated in a counter-clockwise direction during movement of the ratchet plate 68. Such movement will continue until the extreme of the reciprocating motion at which time the indexing pawl 79 will engage in the next notch 78, thereby holding the indexing plate 65 in the desired position and adjusting such position, if necessary.

The pawl 86 which is urged inwardly by the spring 87 to engage in the notches 77 is utilized merely to prevent reverse turning of the turret 40.

An anvil or sub-table 90 is provided on the bed 12 merely to provide additional support for the turret 40 beneath the striker 30. The semicircular member 91 is a guard extending around the exposed working parts of the indexing mechanism.

Figure 5:
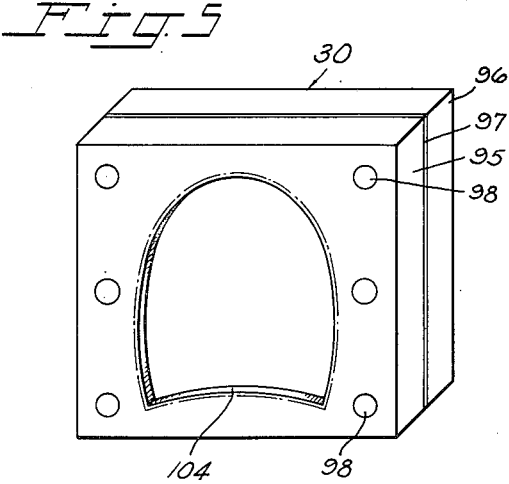
Fig. 5 is a perspective view of a striker constructed in accordance with the invention.

Inasmuch as the clean and efficient cutting of the flash from a rubber heel will depend upon the cooperation of the striker 30 on the dies 41, it has been found desirable to form the striker 30 in the manner shown in Figs. 3 and 5. In accordance with this construction, the striker 30 is composed of a bottom plate 95 and an upper plate 96 which in the embodiments shown are substantially rectangular in outline. The plates 95 and 96 are separated by a rubber sheet 97 such as to permit relative movement, particularly a tilting movement, of the bottom plate 95 with respect to the upper plate 96.

The plates 95 and 96 are held together by a plurality of screws 98 each of which is formed with a shoulder 99 which is received in the aligned bores 100 and 101 in the bottom plate 95 and upper plate 96, respectively. The head 102 of each of the screws 98 is received in a counterbore 103 in the upper plate 96. By reason of this construction the screws 98 may be turned down securely to hold the plates 95 and 96 together, but at the same time, a sufficient force applied to the bottom plate 95 will cause relative movement of the plate 95 with respect to the plate 96, such movement being permitted by the rise of the screws 98 in the counterbores 103.

The reason for this construction of the striker 30 is that in order to provide a clean severance of the flash from the rubber heel there must be a substantially continuous contact of the striker 30 with the cutting edge of the die. If the striker 30 were entirely rigid, any inclination or canting of the cutting edge of the die would cause a separation between the striker and the die which would prevent efficient cutting of the flash. With the striker 30 constructed as described, however, any deviation of the meeting surfaces will be compensated for by tilting of the bottom plate 95.

Inasmuch as the conventional rubber heel is provided with treads or other irregularities on the surface, it is desirable to form the bottom plate 95 with an indentation 104 so that the striker will clear these raised portions of the heel. The indentation 104 is slightly smaller than the die when the die is closed so that the striking force is applied to the rubber heel at the cutting edge of the die. The relationship of the cutting edge of the die with respect to the striker is indicated by the dash and dot line in Fig. 5 of the drawings.

The upper plate 96 is securely fixed to the ram 15 in any suitable manner such as by welding. Although there is a rigid connection between the ram 15 and the upper plate 96, it will be appreciated for the reasons given above that the bottom plate 95 will be able to cant slightly with respect to the upper plate 96, thereby ensuring alignment with the die.

In order to facilitate unloading of the completed heels from the dies 41, there is provided in the embodiment shown in the drawings a plunger 105 extending through a bore 106 of each of the fixed sections 42 of the dies 41. Each of these plungers 105 is provided with a head 107 for engaging underneath the rubber heel and is provided at the opposite end with a head 108 which is slidable in a bore 109 in the turret 40. Each of the bores 109 communicates with the periphery of the turret 40 through a conduit 110. Mounted on the bed 12 by means of bracket 112 is an air hose 113 which may be connected to any suitable source of air under pressure (not shown), which air hose is connected to a shoe 114 adapted to ride on the periphery of the turret 40. The shoe 114 becomes aligned with one of the conduits 110 each time that the turret is indexed. The alignment of the shoe 114 with the conduit 110 admits the air under pressure underneath the disk 108 of the plunger 105, rapidly moving the plunger upwardly to the full extent of its travel, which causes the heel to be forcibly ejected from the mold. A deflector 115 may be attached to the head 13 to guide the ejected heels so that they may be collected in a suitable container adjacent the machine.

It thus will be seen that in order to sever the flash from a plurality of heels it is necessary for the operator merely to insert the heels into the dies 41 and to press the footpedal 32, whereupon the turret 40 is automatically indexed, the die 41 beneath the ram 15 is automatically closed and the ram 15 is automatically actuated to sever the flash from the heel while the previously trimmed heel is automatically unloaded. The insertion of the heels into the dies 41 can be done at a rapid rate because of the opening of the dies 41, as above described, such that there is a clearance all around the periphery of the heel with the result that the heel will readily fall into the die and does not have to be forced therein, and this action will take place even though the rubber heel is not exactly aligned with the die.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine for trimming the flash from molded rubber heels comprising a striker operated by a power press, the combination therewith of a die for cooperation with the striker having a vertical wall adapted to closely fit around the periphery of the heel, said wall having an upper cutting edge beveled on the outer side adapted to underlie the flash at its juncture with the heel, said die being separable along a line extending diagonally of the heel from a forward corner thereof to thereby form separable wall sections the first of which extends from the said corner of the heel across the front and around the opposite side of the heel and the second of which extends around the adjacent side and rear of the heel, said first wall section being extended beyond the corner of the heel to form an abutment for the meeting edge of the second wall section, said meeting edge being formed at an angle so as to provide substantially a point contact at the cutting edge.

2. In a machine for trimming the flash from molded rubber heels comprising a base, a turret mounted on the base for indexing movement about its axis, the combination therewith of a plurality of dies spaced about the turret so as to be indexed therewith to a plurality of stations in sequence, each of said dies being formed with a wall adapted to closely fit around the periphery of the heel, each of said walls having an upper beveled edge adapted to underlie the flash at its juncture with the heel, said dies being separable along a line extending diagonally of the heel from a forward corner thereof and being mounted on the turret with their lines of separation arranged chordally about the axis of rotation of the turret so that the direction of separation is radial of the turret, means for opening the dies during loading and unloading, means for closing the dies during a trimming operation, and a ram operated striker for engaging the upper surface of the heel and flash at the edge of the die when the die is closed to sever the flash from the heel.

3. A machine for trimming the flash from molded rubber heels comprising a base, a turret on said base mounted for indexing movement about its axis, a plurality of dies spaced about the turret so as to be indexed therewith to a plurality of stations in sequence, each of said dies being formed with a wall adapted to closely fit around the periphery of the heel with the upper edge of the wall underlying the flash at its juncture with the heel and comprising a plurality of sections one of which is fixed on the turret and the other of which is slidable toward and away from the fixed section to close and open the die, said sections being separable along a line extending diagonally of the heel from a forward corner thereof, spring means normally separating the die sections, cam means for closing the die when the die is indexed to a trimming station, and a ram operated striker for engaging the upper edge of the die wall at the trimming station.

4. A machine for trimming the flash from molded rubber heels comprising a base, a turret on said base mounted for indexing movement about its axis, a plurality of dies mounted on the turret in spaced relationship so as to be indexed therewith to a plurality of stations, including loading, trimming and unloading stations, in sequence, each of said dies being formed with a wall adapted to closely fit around the periphery of the heel with the upper edge of the wall underlying the flash at its juncture with the heel and comprising a plurality of sections one of which is fixed on the turret and the other of which is slidable toward and away from the fixed section to close and open the die, said sections being separable along a line extending diagonally of the heel from a forward corner thereof, means for separating the die sections at the loading and unloading stations and for closing the die at the trimming station, a tiltable striker, ram means for impelling the striker against the die at the trimming station, and means for automatically unloading the heel from the die at the unloading station.

5. A machine for trimming the flash from molded rubber heels comprising a base, a turret on said base mounted for indexing movement about its axis, a plurality of dies mounted on the turret in spaced relationship so as to be indexed therewith to a plurality of stations in sequence, each of said dies being formed with a wall having an upper beveled edge adapted to closely fit around the periphery of the heel with the said edge underlying the flash at its juncture with the heel and comprising a fixed section secured to the turret and a movable section slidable on the turret, said die sections being separable along a line extending diagonally of the heel from a forward corner thereof, said lines of separation being disposed parallel to tangents to the turret, spring means normally separating said sections, cam means adapted to bear against the movable section to close the die as the die is indexed to one of said stations, a striker comprising a bottom plate having an indentation slightly smaller in outline than the outline of the heel, an upper plate and a rubber sheet therebetween, a ram to which the striker is affixed arranged to propel the striker against a heel in a die at said one station, means for removing the trimmed heel from the die at a station subsequent to the said one station comprising a plunger in said fixed section mounted for limited longitudinal movement, an air passageway for admitting air under pressure underneath the plunger to drive it upwardly to eject the heel from the die, and an air inlet means adapted to register with said passageway when the die is at said subsequent station, and power means for indexing the turret and actuating the ram in sequence.

GERALD EATON.

REFERENCES CITED

The following references are of record in the file of this patent:

UNITED STATES PATENTS

| Number | Name | Date |
|---|---|---|
| 931,830 | Zimmerman | Aug. 24, 1909 |
| 1,070,729 | Prime et al. | Aug. 19, 1913 |
| 1,091,707 | Reed | Mar. 31, 1914 |
| 1,205,120 | Valpey | Nov. 14, 1916 |
| 2,101,654 | Sheehan | Dec. 7, 1937 |
| 2,191,655 | Hardy | Feb. 27, 1940 |
| 2,350,238 | Knight | May 30, 1944 |